(12) United States Patent
Banerjee

(10) Patent No.: US 7,190,669 B2
(45) Date of Patent: Mar. 13, 2007

(54) SYSTEM, METHOD AND COMPUTER READABLE MEDIUM FOR FLOW CONTROL OF DATA TRAFFIC

(75) Inventor: Sujata Banerjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 10/192,453

(22) Filed: Jul. 9, 2002

(65) Prior Publication Data

US 2004/0008628 A1    Jan. 15, 2004

(51) Int. Cl.
*H04J 1/16* (2006.01)
(52) U.S. Cl. .................... 370/229; 370/252
(58) Field of Classification Search ........... 370/229, 370/230, 232, 235, 236.1, 236.2, 237, 238, 370/238.1, 252, 389, 386
See application file for complete search history.

(56) References Cited

U.S. PATENT DOCUMENTS 5,400,329 A * 3/1995 Tokura et al. .............. 370/232
5,901,140 A    5/1999 Van As et al.
6,170,022 B1   1/2001 Linville et al.
6,208,653 B1 * 3/2001 Ogawa et al. ......... 370/395.52
6,240,067 B1 * 5/2001 Sorber ...................... 370/236

FOREIGN PATENT DOCUMENTS

EP           955749 A1 *  11/1999

OTHER PUBLICATIONS

Reza Rejaie, Mark Handley & Deborah Estrin—RAP: An End-to-End-Based Congestion Control Mechanism for Realtime Streams in the Internet—University of Southern California Information Sciences Institute—Jul. 15, 1998—pp. 1-27.

* cited by examiner

*Primary Examiner*—Brenda Pham
(74) *Attorney, Agent, or Firm*—Richard P. Lange

(57) ABSTRACT

A method of controlling the flow of data traffic from a source node to a destination node through a flow-controlling node in a data communication network is disclosed. The flow-controlling node monitors data traffic transiting therethrough to detect a congested condition. A congestion notification is sent to the source node when the congested condition is detected. The source node determines a delay period based on a packet inter-arrival time, $i_a$, of data traffic at the source node. The source node then delays direction of data traffic to the flow-controlling node by the delay period.

20 Claims, 3 Drawing Sheets

SYSTEM, METHOD AND COMPUTER READABLE MEDIUM FOR FLOW CONTROL OF DATA TRAFFIC

BACKGROUND

This invention relates to data communication networks and more particularly to a system and method for providing flow control of data traffic through a link in a data communication network during a congested condition.

In a data communication network, flow control is used to control sources of data traffic so that the sources do not send too much data into the network at any moment. If a trunk or link in the network is overloading, all the sources using that link must be told to slow down. The transmission control protocol (TCP) used on the Internet uses an end-to-end congestion control algorithm, where TCP data traffic sources are required to send less traffic when congestion is indicated by loss of transmitted packets. TCP congestion control is conservative and uses an Additive Increase Multiplicative Decrease (AIMD) scheme to increase data transmission slowly after congestion has alleviated and to decrease data transmission rapidly when congestion is detected.

The initial TCP congestion control has undergone many changes over the years. Active queue management schemes, such as the Random Early Detection (RED) scheme, have been developed to manage congestion better. Furthermore, TCP-friendly schemes, such as the TCP-friendly Rate Control (TFRC) scheme, have been proposed to allow non-TCP traffic sources to have a smoother transmission rate, which is particularly important for media applications. Some of these techniques involve multiple parameters that are difficult and tedious to determine or tune to attain the desired mean delay, standard deviation of delay and link utilization. Moreover, some of these techniques adversely disrupt the original data traffic pattern to render them unsuitable for use in emerging applications wherein data has to be received close to the original data traffic pattern. An example of such emerging applications is the streaming of audio and video signals over a network.

Another prior art technique for flow control is the static peak rate control (PRC) technique. In the PRC technique, a source sends data at a rate that is not higher than a negotiated peak rate. That is, the inter-packet gap between any two data packets has to be above a predetermined value derived from the negotiated peak rate. Such a technique smoothes the data traffic to thereby reduce the mean delay and the standard deviation of the delay. This technique nonetheless suffers from low link utilization. There are times during operation when a link is available but not used because of the strict adherence to a selected peak rate.

There are other techniques that provide flow control by throttling a source when it is determined that there is congestion on a link. One such technique is described in U.S. Pat. No. 6,170,022, Linville et al., entitled "Method and System for Monitoring and Controlling Data Flow in a Network Congestion State by Changing Each Calculated Pause Time by a Random Amount." Flow control according to the patent is implemented at a given node in a network of local area network (LAN) switches by having the node monitor the occupancy levels of queues or buffers. When a buffer is found to be occupied or filled beyond a predetermined threshold level, a pause command is generated for the source currently supplying traffic to the buffer. A pause time (PT) is calculated using an equation which takes into account (1) the transmission rate of the identified source, (2) the transmission rate of the output link servicing the congested buffer and (3) the queue or buffer length that can be occupied without a congestion condition being declared. To reduce the chance that queue lengths will "oscillate" about their threshold point due to multiple sources resuming transmission at the same time, each calculated pause time is adjusted to a randomly selected value falling within a range of PT±kPT, where k may be on the order of fifty percent. A disadvantage of such a scheme is that there may be significant deviations from the desired traffic pattern.

SUMMARY

According to an aspect of the present invention, there is provided a method of controlling the flow of data traffic from a source node to a destination node through a flow-controlling node in a data communication network. The flow-controlling node monitors data traffic transiting therethrough to detect a congested condition. A congestion notification is sent to the source node when the congested condition is detected. The source node determines a delay period based on a packet inter-arrival time, $i_a$, of data traffic at the source node. The source node then delays direction of data traffic to the flow-controlling node by the delay period.

According to another aspect of the present invention, there is a system for controlling the flow of data traffic in a data communication network. The system includes a source node for transmitting the data traffic to a receiving node. The system also includes a flow-controlling node for monitoring transiting data traffic to detect a congested condition. The flow-controlling node sends a congestion notification to the source node when the congested condition is detected. The source node delays the data traffic by a delay period based on a packet inter-arrival time of the data traffic in response to the congestion notification.

According to yet another aspect of the present invention, there is a program storage device readable by a computing device, tangibly embodying a program of instructions, executable by the computing device to perform the above-described method of controlling the flow of data traffic from a source node to a destination node.

BRIEF DESCRIPTION OF DRAWINGS

The invention will be better understood with reference to the drawings, in which.

DETAILED DESCRIPTION

Figure 1:
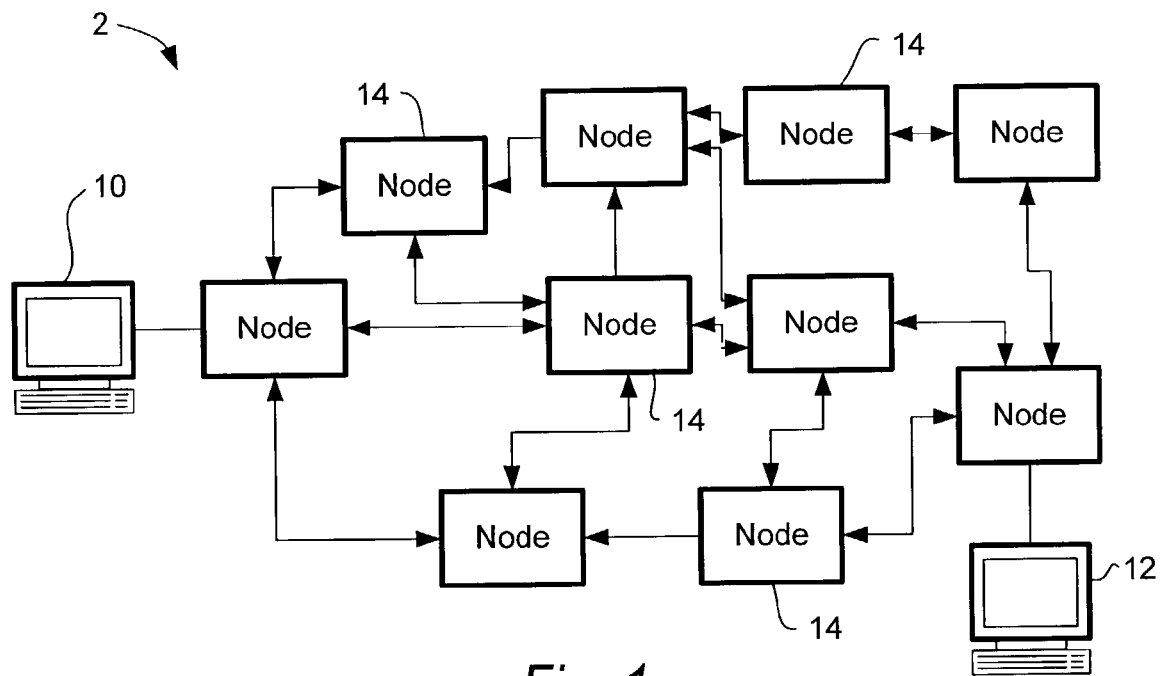
FIG. 1 is an illustration of a mesh-connected network including a plurality of nodes.

FIG. 1 shows a generic data communication network 2 which supports data communications between remote users or end nodes 10, 12. In such a network 2, data originating at one of the end nodes 10 reaches the other end node 12 after traversing an intervening network generically represented as a number of mesh-connected data systems or nodes 14. The configuration and functionality of the nodes 14 will vary as a function of the networking protocols implemented in the network 2.

Figure 2:
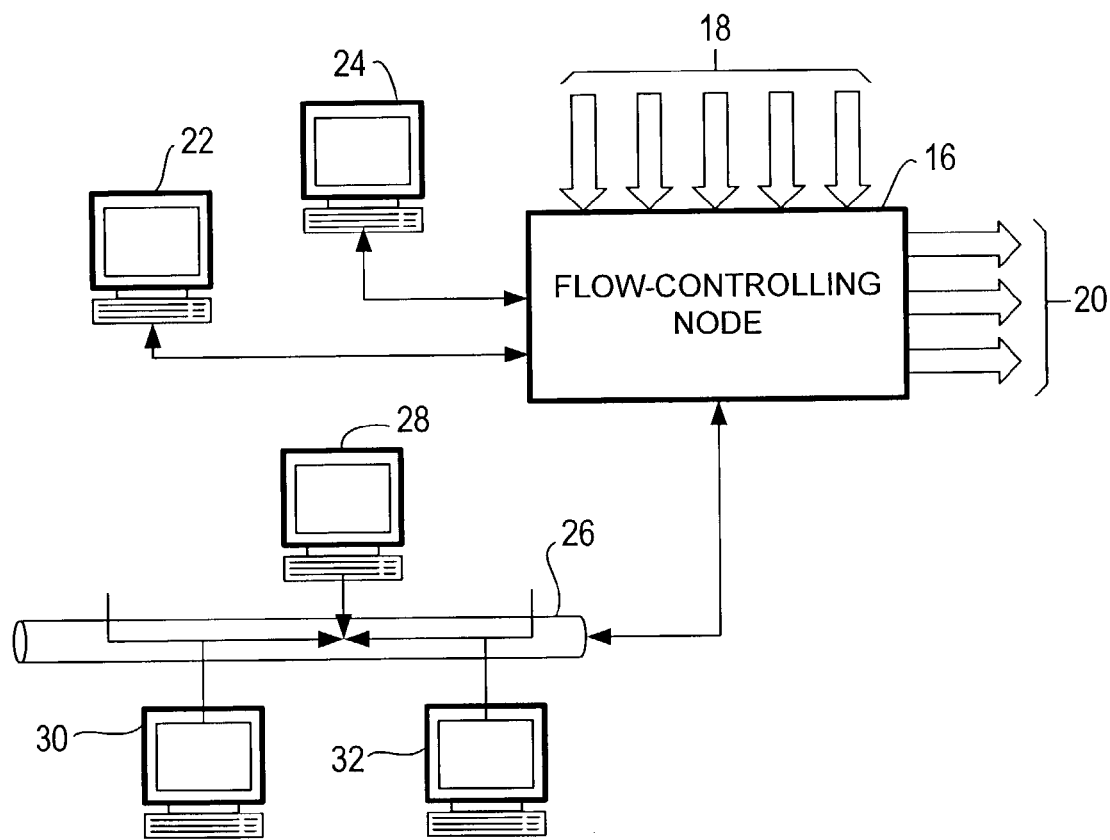
FIG. 2 is an illustration of one of the plurality of nodes in FIG. 1 operating as a flow-controlling node.

FIG. 2 shows a switch or flow-controlling node 16 that is a part of a node 14 or a dedicated node 14. The flow-controlling node 16 is not necessarily a simple pass-through device connecting other nodes 14. The flow-controlling node 16 should be capable of receiving data traffic from other nodes 14 over a set of input links 18 and of routing or switching that data traffic to an output link selected from a set of output links 20. Typically, a flow-controlling node 16 must also be able to handle locally-originated data traffic, such as might be provided by other end nodes 22, 24 connected directly to the flow-controlling node 16. The flow-controlling node 16 must also be able to handle data generated by still other end nodes 28, 30, 32 on a LAN 26 connected to the flow-controlling node 16.

Figure 3:
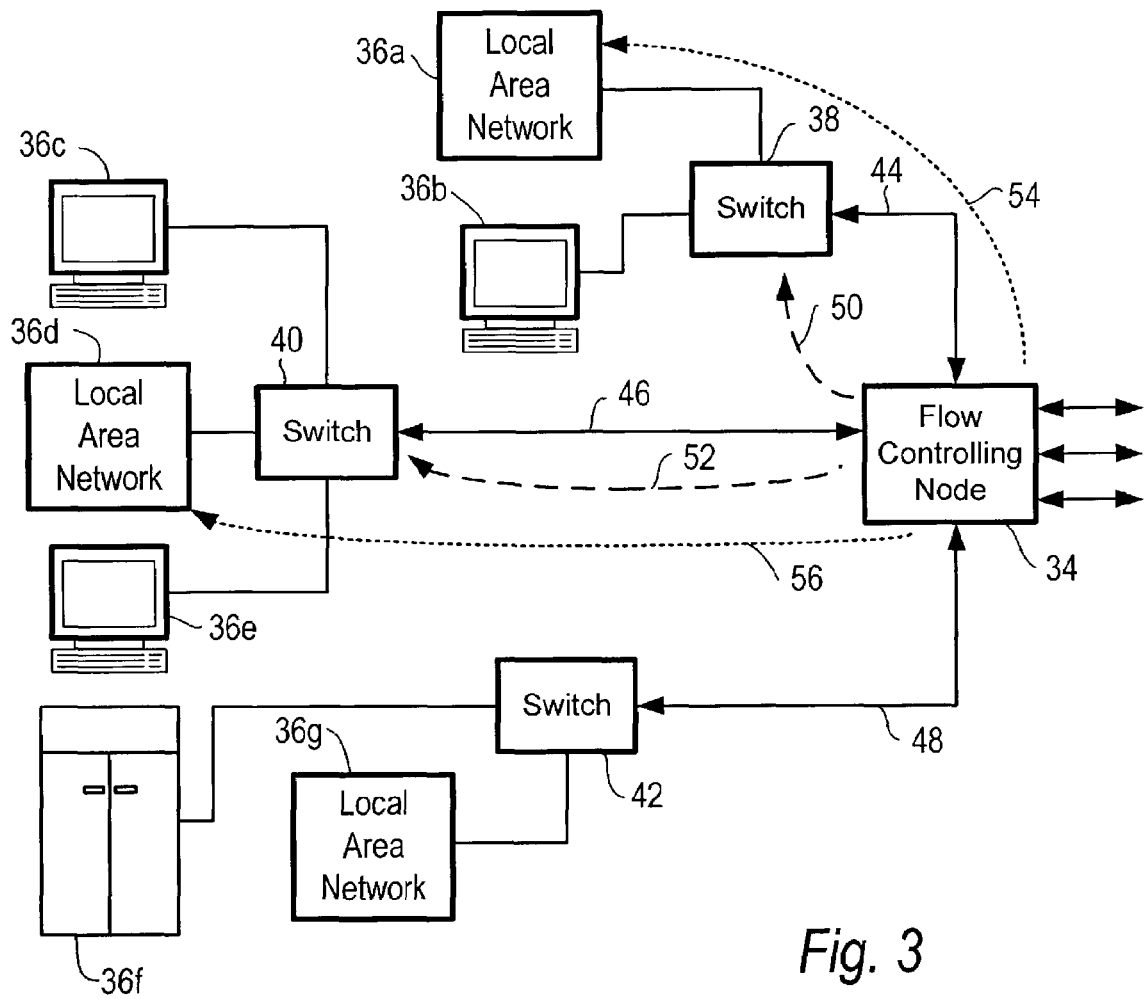
FIG. 3 is yet another illustration of one of the plurality of nodes in FIG. 1 operating as a flow-controlling node shown sending congestion notifications to source nodes that direct data traffic to the flow-controlling node.

FIG. 3 shows a flow-controlling node 34, which performs data routing/switching. The flow-controlling node 34 acts as a concentrator for data traffic originating at multiple, independent sending nodes or sources 36a–36g. The sending nodes 36a–36g provide the data traffic to the flow-controlling node 34 through a set of LAN switches 38, 40, 42 connected to the flow-controlling node 34 through links 44, 46, 48 respectively. The traffic sources 36a–36g operate independently of one another. The possibility exists that the traffic sources 36a–36g will, at some point during their normal operation, try to supply more data traffic than the flow-controlling node 34 can process without incurring unacceptable delays or losses. Such a state leads to a congested condition at the flow-controlling node 34. The present invention seeks to alleviate the congested condition using a flow control technique which controls the flow of data traffic from upstream nodes that are the source of the congestion.

Flow control can be performed either on a link level or a source level. When link level flow control is being performed, the flow-controlling node 34 can respond to detected congestion by identifying upstream switches 38, 40, 42 through which congestion-inducing traffic is routed. Assuming two of these switches 38, 40 are identified as forwarders of congestion-inducing traffic, congestion notifications, represented by broken arrows 50, 52 would be directed to those switches 38, 40. Upon receipt of the congestion notifications 50, 52, these two switches 38, 40 temporarily suspend any transfer of data traffic to the flow-controlling node 34 over the links 44, 46 respectively for a switch-specific delay period.

When source level flow control is being performed, the flow-controlling node 34 would identify specific upstream nodes, such as two of sources 36a, 36d providing congestion-inducing traffic. Generated congestion notifications, represented by broken arrows 54, 56 would be directed only to those specific sources 36a, 36d. Upon receipt of the congestion notifications, the sources 36a, 36d temporarily suspend sending of traffic destined for the flow-controlling node 34 for a source-specific delay period. The determination of this delay period will be discussed later.

The congestion notification is sent using explicit congestion notification (ECN) techniques, such as those discussed in the article "Proposal to add Explicit Congestion Notification (ECN)", by K. Ramakrishnan and S. Floyd, RFC 2481, January 1999. In the article, an ECN message is described to be sent to a destination node, which then informs a source node of a congestion condition in an acknowledgement packet.

Figure 4:
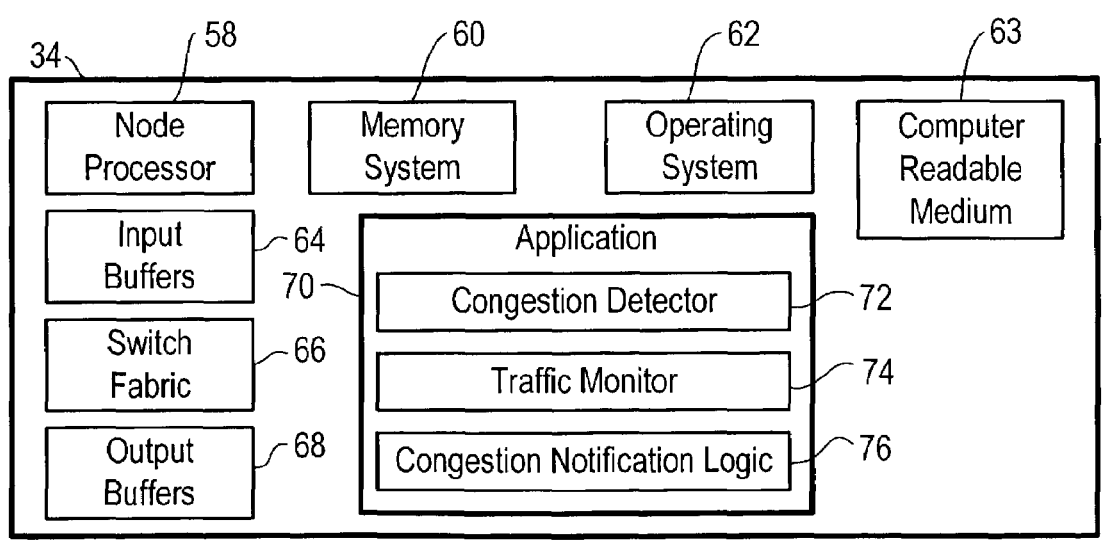
FIG. 4 illustrates the major functional components of the flow-controlling node in FIG. 3.

FIG. 4 is a block diagram of the flow-controlling node 34 for performing traffic management in a network. Such a flow-controlling node 34 can be characterized as a specialized data processing system. Like any data processing system, the flow-controlling node 34 includes a node processor 58, a memory system 60, an operating system 62 and at least one computer readable medium 63. Examples of a computer readable medium 63 include a CD-ROM, tape, magnetic media, EPROM, EEPROM, ROM or the like. The flow-controlling node 34 stores one or more computer programs that partially implement a method of flow control according to an embodiment of the present invention. The node processor 58 reads and executes the one or more computer programs to partially perform the method. To support routing and switching operations, the flow-controlling node 34 also includes a set of input buffers 64 for temporarily storing data arriving over different connections on the input links 18. The flow-controlling node 34 also includes a switch fabric 66 and a set of output buffers 68 for temporarily storing switched data traffic until it can be transmitted onto output links 20 from the flow-controlling node 34.

The one of more computer programs 70 includes a congestion detector 72, a traffic monitor 74 and a congestion notification logic 76. The congestion detector 72 may use any suitable technique to provide an indication of congestion at the flow-controlling node 34. As noted earlier, one commonly employed technique is to monitor the occupancy level or length of an output buffer 68. A threshold occupancy level or buffer length is defined for the output buffer 68. As long as the occupancy level or length of the output buffer 68 remains below this threshold, the output link served by the output buffer 68 is considered to be congestion-free and no flow control action is performed. If, however, the output buffer 68 becomes occupied beyond the threshold occupancy level or buffer length, the output link is considered to be congested or in a congested condition and flow control operation according to an embodiment of the present invention will be initiated.

Figure 5:
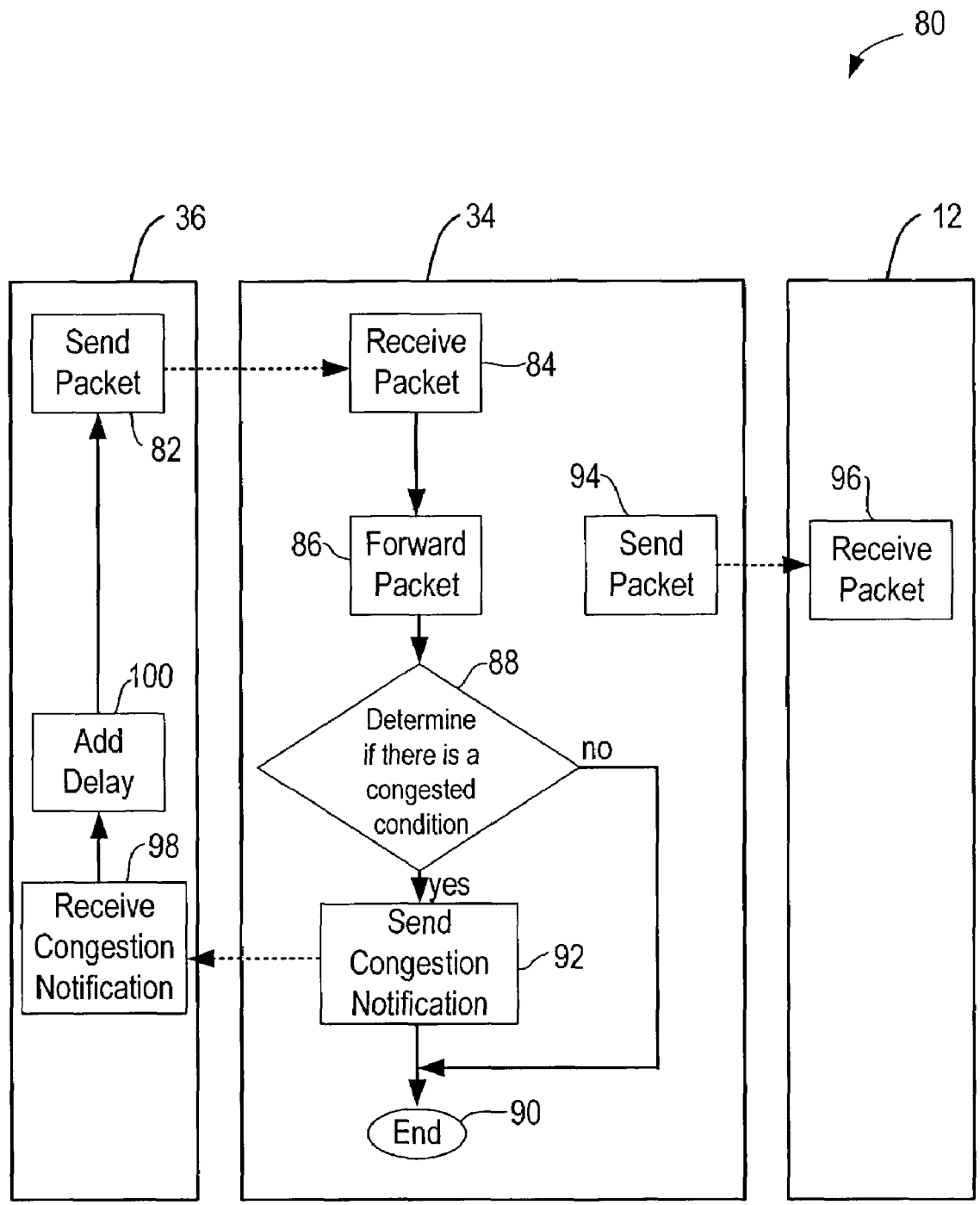
FIG. 5 is a flow chart showing a sequence of steps implemented in the network in FIG. 1 for providing flow control according to an embodiment of the present invention.

FIG. 5 is a flow chart of a sequence of steps for providing flow control in a system 80 including a source node 36, a destination node 12 and a flow-controlling node 34 on a link between the source node 36 and the destination node 12. The sequence starts in a SEND PACKET step 82 in the source node 36, wherein the source node 36 sends a data packet destined for the destination node 12 via the flow-controlling node 34. The sequence next proceeds to a RECEIVE PACKET step 84 in the flow-controlling node 34, wherein the flow-controlling node 34 receives and processes the data packet at an input buffer 64. The sequence next proceeds to a FORWARD PACKET step 86, wherein the flow-controlling node 34 transfers the received data packet to an appropriate output buffer 68. The sequence next proceeds to a DETERMINE CONGESTED CONDITION step, wherein the congestion detector 72 determines if the output buffer 68 is in a congested state. The flow-controlling node 34 is in a congested condition when the number of packets in the output buffer 68 has exceeded a predetermined occupancy level or length.

If it is determined in the DETERMINE CONGESTION CONDITION step 88 that there is no congested condition, the sequence ends in an END step 90 in the flow-controlling node. If however it is determined that the congested condition is reached, the sequence proceeds to a SEND CONGESTION NOTIFICATION step 92, wherein the congestion notification logic 76 sends a congestion notification to the source node 36. Such a congestion notification can be sent to the source node 36 by the flow-controlling node 34 to directly notify the source node 36. The identity of the source node 36 may be determined from the received data packet. The sequence next proceeds to the END step 90. The flow-controlling node 34 forwards the data packet in the output buffer to the destination node 12 in a second SEND PACKET step 94. The data packet is received at the destination node 12 in a second RECEIVE PACKET step 96.

The source node 36 receives the congestion notification in a RECEIVE CONGESTION NOTIFICATION step 98, either indirectly from the destination node, or directly from the congested flow-controlling node 34. In a subsequent ADD DELAY step 100, the source node 36 indicates that a next data packet for transmission will be delayed by a source-specific delay period. The delay period will be described shortly. The source node 36 delays the sending of the next data packet available for transmission to the flow-controlling node 34 by the delay period in the SEND PACKET step 82. If the source node 36 is currently transmitting a packet, the delay in transmission of a data packet is applicable only after the current packet has been completely transmitted. The delay is one-off. In other words, the source node 36 delays the transmission of only a single complete data packet that is to be transmitted next. Transmission of data packets subsequent to this delayed data packet is not subjected to any further delay. These subsequent data packets are transmitted with packet inter-arrival times as previously determined by the source node 36. The source node 36 therefore stalls momentarily before resuming transmission of packets according to its original data traffic pattern. Distortion in the original source traffic pattern caused by such a delay is low. However, the mean delay and delay variance are reduced significantly.

The determination of the delay period is next described. The source node 36 determines the delay period based on the packet inter-arrival time, $i_a$, of data traffic at the source node 36 at the time the congestion notification is received. The delay period includes multiplying the packet inter-arrival time, $i_a$, with a multiplier, k. In other words, the delay period is given by $k*i_a$. The value of the multiplier, k, may be determined off-line, for example through simulations, prior to any actual data traffic transmission by the source node 36. The value of the multiplier, k, is determined independently of other sources transmitting data traffic through the flow-controlling node 34.

Alternatively, the value of the multiplier, k, may be determined by the source node 36 in cooperation with the flow-controlling node 34 during data traffic transmission. A mean delay is determined by the traffic monitor 74 for each of a predetermined number of samples of data packets from the source node 36. The source node 36 informs the flow-controlling node 34 of the start and the size of each sample. Such information may be coded as part of a transmitted data packet or in a separate control frame (both of which are not shown). The flow-controlling node 34 determines the mean delay of each sample and returns the mean delay to the source node 36 when the last data packet of each sample is received. The value of k at the source node 36 is set to a different preliminary value for each of the samples. The preliminary value of k is selected from a predetermined range of values, such as 0 –2.5. The final value of the multiplier, k, is set to the preliminary value of k for the sample that results in the lowest mean delay. The multiplier, k, then retains this final value of k when processing data packets subsequent to those that form the samples.

Instead of changing the value of k to a different preliminary value as described above for each and every sample, changing the value of k at the source node 36 for a next sample may be based upon a difference between an average link utilization of a current sample and a cumulative average link utilization for all preceding samples up to the current sample. The value of the multiplier, k, is changed if the difference is within a predetermined percentage. The manner in which the preliminary values of the multiplier, k, is selected for the samples affects the cumulative average link utilization. As such, the value of the multiplier, k, may be changed according to an ascending order, a descending order or in a random manner.

Such automatic determination of the value of the multiplier, k, may be repeated after a predetermined period, such as after transmission of a predetermined number of packets. Alternatively, determination of the value of the multiplier, k, may be repeated when a change in the type of the data traffic is detected.

Advantageously, the method of flow control described above where the delay period is based on the packet inter-arrival time of a source node is most likely to result in different delay periods for different sources. The different source nodes therefore back off transmission of data traffic to a congested flow-controlling node by the different delay periods, thus easing or alleviating the congestion condition at the flow-controlling node. The single multiplier, k, is the sole parameter whose value needs to be determined, rendering the method less complicated to tune as compared to prior art techniques. The value of the multiplier, k, can also be determined and changed automatically whenever data traffic pattern changes. Furthermore, from simulation results, it is found that the method disrupts the original source traffic pattern less than the prior art, making the method particularly suitable for applications such as those for streaming media.

Although the present invention is described as implemented in a network with a generic flow-controlling node, it is not to be construed to be limited as such. For example, the invention may be used in a network router.

As another example, instead of the flow-controlling node sending the congestion notification to the source node, the flow-controlling node may mark data packets arriving at the flow-controlling node during a congested condition instead. The receiving node may then detect these marked data packets to send congestion notifications to the respective source nodes to reduce the processing load on the flow-controlling node.

I claim:

1. A method of controlling the flow of data traffic from a source node to a destination node through a flow-controlling node in a data communication network, the method comprising:
    monitoring data traffic transiting the flow-controlling node between the source and destination nodes to detect a congested condition;
    sending a congestion notification to the source node when the congested condition is detected;
    determining a delay period based on a packet inter-arrival time, $i_a$, of data traffic at the source node, wherein determining a delay period includes
    determining a value of a multiplier, k; and
    multiplying the packet inter-arrival time by the value of the multiplier, k, to result in the delay period; and
    delaying direction of data traffic by the source node to the flow-controlling node by the delay period.

2. A method according to claim 1, wherein determining a value of the multiplier, k, includes determining a value of the multiplier, k, prior to any data traffic transmission by the source node.

3. A method according to claim 1, wherein determining a value of the multiplier, k, includes determining a value of the multiplier, k, by the source node cooperating with the flow-controlling node during data traffic transmission.

4. A method according to claim 3, wherein determining a value of the multiplier, k, includes determining a value of the multiplier, k, independently of nodes other than the source node transmitting data traffic through the flow-controlling node.

5. A method according to claim 4, wherein determining a value of the multiplier, k, includes:
    selecting a predetermined number of samples of packets of transmitted data traffic;

assigning the multiplier, k, of each sample a preliminary value selected from a predetermined range of values;

determining the mean delay of packets for each of the samples;

using the preliminary value that results in a lowest mean delay as the value of the multiplier, k, for delaying packers following those in the samples.

6. A method according to claim 5, further including:

determining a cumulative average link utilization for the predetermined number of samples; and wherein assigning the multiplier, k, of each sample a preliminary value includes assigning the multiplier, k, to a different value selected from a predetermined range of values only if the difference between the average link utilization of the flow-controlling node of a current sample and the cumulative average link utilization for all preceding samples up to the current sample is within a predetermined value.

7. A method according to claim 4, wherein determining a value of the multiplier, k, includes:

for each of a predetermined number of samples packets of transmitted data traffic;

setting a preliminary value of the multiplier, k, to a different value selected from a predetermined range of values; and determining a mean delay; and setting a final value of the multiplier, k, to the preliminary value that results in a lowest mean delay for the samples.

8. A method according to claim 7, further including:

determining a cumulative average link utilization for the predetermined number of samples; and wherein setting a preliminary value of the multiplier, k, includes setting a preliminary value of the multiplier, k, to a different value selected from a predetermined range of values only if the difference between the average link utilization of the flow-controlling node of a current sample and the cumulative average utilization for all preceding samples up to the current sample is within a predetermined value.

9. A method according to claim 8, further including repeating determining the value of the multiplier, k, after a predetermined period.

10. A method according to claim 8, further including repeating determining the value of the multiplier, k, when there is a change in a type of the data traffic.

11. A method according to claim 1, wherein sending a congestion notification to the source node includes:

marking data packets of the data traffic that result in the congested condition at the flow-controlling node; and sending a congestion notification to the source node by the destination node when the marked data packets arc received by the destination node.

12. A system for controlling the flow of data traffic in a data communication network comprising:

a source node for transmitting the data traffic and delaying the data traffic by a delay period based on a packet inter-arrival time of the data traffic in response to a congestion notification, wherein the delay period is given by the packet inter-arrival time multiplied by a multiplier, k;

a destination node for receiving the transmitted data traffic; and a flow-controlling node for monitoring transiting data traffic between the source and destination nodes to detect a congested condition and for sending a congestion notification to the source node when to congested condition is detected.

13. A system according to claim 12, wherein the value of the multiplier, k, is fixed prior to any data waffle transmission by the source node.

14. A system according to claim 12, wherein the value of the multiplier, k, is determined by the source node cooperating with the flow-controlling node during data traffic transmission.

15. A system according to claim 14, wherein the value of the multiplier, k, is determined independently of nodes other that the source node transmitting data traffic through the flow-controlling node.

16. A system according to claim 15, wherein the value of the multiplier, k, is set to a preliminary value that results in a lowest mean delay for a sample of packets of transmitted data traffic, the sample being one of a predetermined number of samples whose mean delays are obtained with different preliminary values of the multiplier, k, wherein the preliminary values changes from sample to sample.

17. A system according to claim 16, wherein a cumulative average link utilization for the predetermined number of samples is maintained and the preliminary value of the multiplier, k, for a next sample is changed only if the difference between the average link utilization of the flow-controlling node of a current sample and the cumulative average link utilization for all preceding samples up to the current sample is within a predetermined value.

18. A system according to claim 17, wherein determination of the value of the multiplier, k, is repeated after a predetermined period.

19. A system according to claim 17, wherein determination of the value of the multiplier, k, is repeated when there is a change in a type of the data traffic.

20. A program storage device readable by a computing device, tangibly embodying a program of instructions, executable by the computing device to perform a method of controlling the flow of data traffic from a source node to a destination node through a flow-controlling node in a data communication network, the method comprising:

monitoring data traffic transiting the flow-controlling node between the source and the destination nodes to detect a congested condition;

sending a congestion notification to the source node when the congested condition is detected;

determining a delay period based on a packet inter-arrival time, $i_a$, of data traffic at the source node, wherein determining a delay period includes determining value of a multiplier, k; and multiplying the packet inter-arrival time by the value of the multiplier, k, to result in the delay period; and delaying direction of data traffic by the source node to the flow-controlling node by the delay period.

* * * * *

UNITED STATES PATENT AND TRADEMARK OFFICE
CERTIFICATE OF CORRECTION

PATENT NO. : 7,190,669 B2
APPLICATION NO. : 10/192453
DATED : March 13, 2007
INVENTOR(S) : Sujata Banerjee It is certified that error appears in the above-identified patent and that said Letters Patent is hereby corrected as shown below:

In column 7, line 7, in Claim 5, delete "packers" and insert -- packets --, therefor.

In column 7, line 21, in Claim 7, after "samples" insert -- of --.

In column 7, line 38, in Claim 8, after "average" insert -- link --.

In column 7, line 52, in Claim 11, delete "arc" and insert -- are --, therefor.

In column 8, line 6, in Claim 12, after "when" delete "to" and insert -- the --, therefor.

In column 8, line 9, in Claim 13, delete "waffle" and insert -- traffic --, therefor.

In column 8, line 55, in Claim 20, after "determining" insert -- a --.

Signed and Sealed this

Twentieth Day of January, 2009

JON W. DUDAS
*Director of the United States Patent and Trademark Office*